United States Patent
Iida et al.

(10) Patent No.: US 7,889,368 B2
(45) Date of Patent: Feb. 15, 2011

(54) SERVICE PROCESSING SYSTEM, SERVICE PROCESSING METHOD AND SERVICE PROCESSING DEVICE

(75) Inventors: Hiroshi Iida, Kawasaki (JP); Tohru Mori, Kawasaki (JP); Kenji Kawase, Kawasaki (JP); Hiroomi Ichiba, Kawasaki (JP); Satoshi Kaito, Kawasaki (JP); Reiko Aoyama, Kawasaki (JP); Noriyuki Abe, Kawasaki (JP); Nobuyuki Takao, Kawasaki (JP); Yumiko Koga, Kawasaki (JP); Mitsushige Oguri, Kawasaki (JP); Takanobu Suzuki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1432 days.

(21) Appl. No.: 10/785,095

(22) Filed: Feb. 25, 2004

(65) Prior Publication Data

US 2004/0177337 A1   Sep. 9, 2004

(30) Foreign Application Priority Data

Mar. 5, 2003   (JP)   ............................. 2003-058695

(51) Int. Cl.
   *G06F 3/12*   (2006.01)
(52) U.S. Cl. .................... 358/1.15; 358/1.13; 358/1.14; 707/694
(58) Field of Classification Search ................ 358/1.13, 358/401, 405, 406, 434, 437, 438, 439, 498; 342/147; 710/260; 707/694, 966, 999.104; 718/102, 106

See application file for complete search history.

(56) References Cited

U.S. PATENT DOCUMENTS

| | | | | |
|---|---|---|---|---|
| 2,896,204 | A * | 7/1959 | Gille | 342/147 |
| 5,146,598 | A * | 9/1992 | Takezawa | 710/260 |
| 5,172,246 | A * | 12/1992 | Yoshida | 358/406 |
| 5,175,735 | A * | 12/1992 | Dahlby et al. | 714/2 |
| 5,253,079 | A * | 10/1993 | Nakatani et al. | 358/3.29 |
| 5,532,839 | A * | 7/1996 | Beikirch et al. | 358/401 |
| 5,822,084 | A * | 10/1998 | Hwang | 358/437 |
| 6,101,243 | A * | 8/2000 | Kim | 379/100.05 |
| 6,279,113 | B1 * | 8/2001 | Vaidya | 726/23 |
| 6,353,899 | B1 * | 3/2002 | Martin et al. | 714/57 |
| 6,388,760 | B2 * | 5/2002 | Kadota et al. | 358/1.14 |
| 6,609,162 | B1 * | 8/2003 | Shimizu et al. | 710/15 |
| 6,885,469 | B1 * | 4/2005 | Tanimoto | 358/1.14 |
| 6,975,421 | B1 * | 12/2005 | Hashimoto et al. | 358/1.16 |
| 7,027,176 | B2 * | 4/2006 | Tanimoto | 358/1.15 |

(Continued)

FOREIGN PATENT DOCUMENTS

JP   A 3-241961   10/1991

(Continued)

*Primary Examiner*—Twyler L Haskins
*Assistant Examiner*—Dennis Dicker
(74) *Attorney, Agent, or Firm*—Oliff & Berridge, PLC

(57) ABSTRACT

The present invention provides increased processing reliability for a service of performing predetermined processes on document data through cooperation among the processes over a network A service processing device in a service processing system providing a service of performing predetermined processes on document data through cooperation among the processes over a network comprises a controller that controls reexecution of a process in which an error occurs, if the error occurs on the document data in the course of the processes.

21 Claims, 11 Drawing Sheets

U.S. PATENT DOCUMENTS

| | | | |
|---|---|---|---|
| 7,249,283 B2 * | 7/2007 | Platteter | 714/25 |
| 7,254,743 B2 * | 8/2007 | Iida et al. | 714/15 |
| 7,260,747 B2 * | 8/2007 | Matsumura | 714/38 |
| 7,299,244 B2 * | 11/2007 | Hertling et al. | 707/694 |
| 7,352,481 B2 * | 4/2008 | Christiansen | 358/1.13 |

FOREIGN PATENT DOCUMENTS

| | | |
|---|---|---|
| JP | A 11-163872 | 6/1999 |
| JP | A 11-261754 | 9/1999 |
| JP | A 2001-195295 | 7/2001 |
| JP | A 2001-325389 | 11/2001 |
| JP | A 2001-356946 | 12/2001 |
| JP | A 2002-99686 | 4/2002 |
| JP | A 2002-215394 | 8/2002 |

* cited by examiner

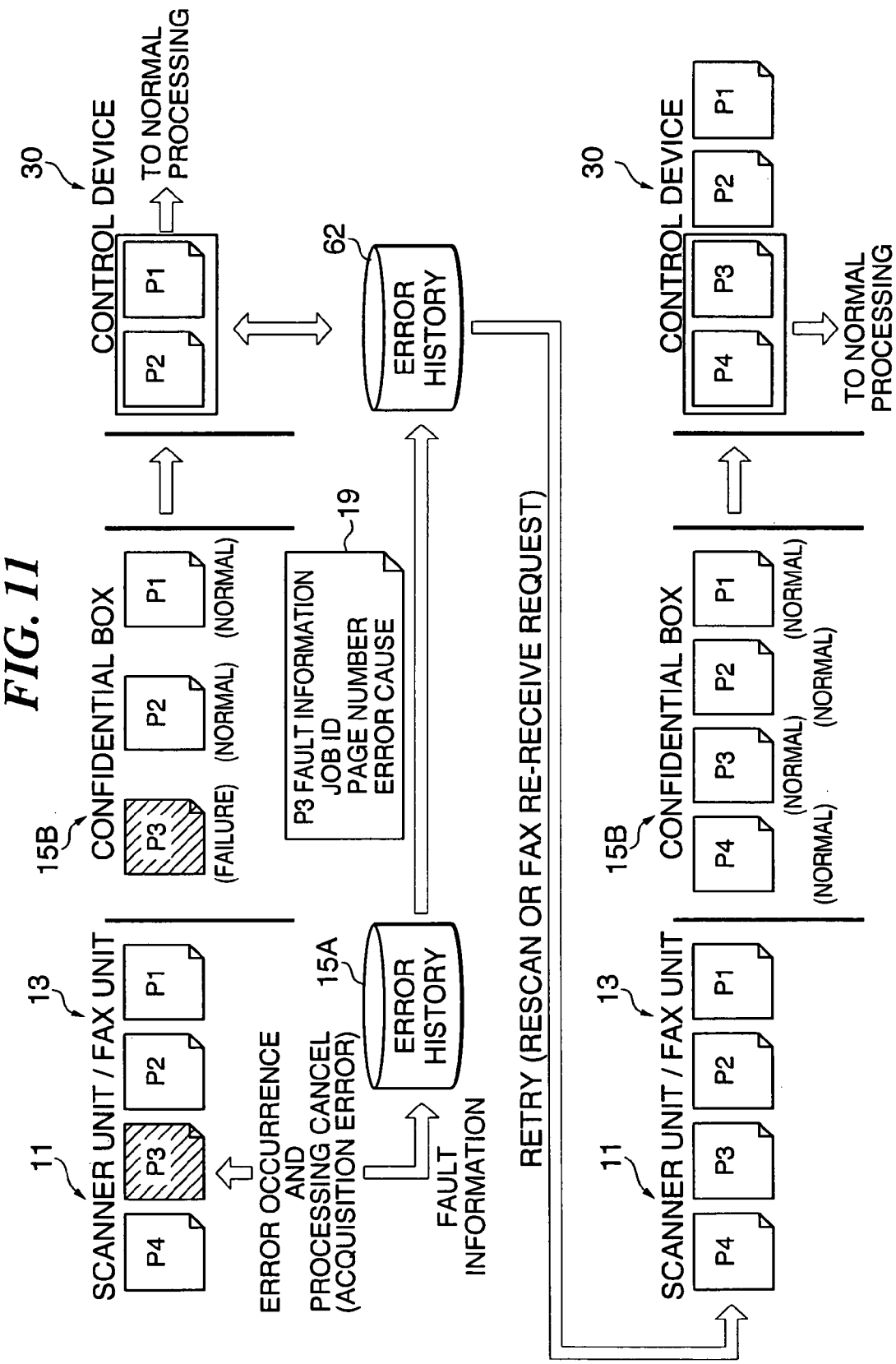

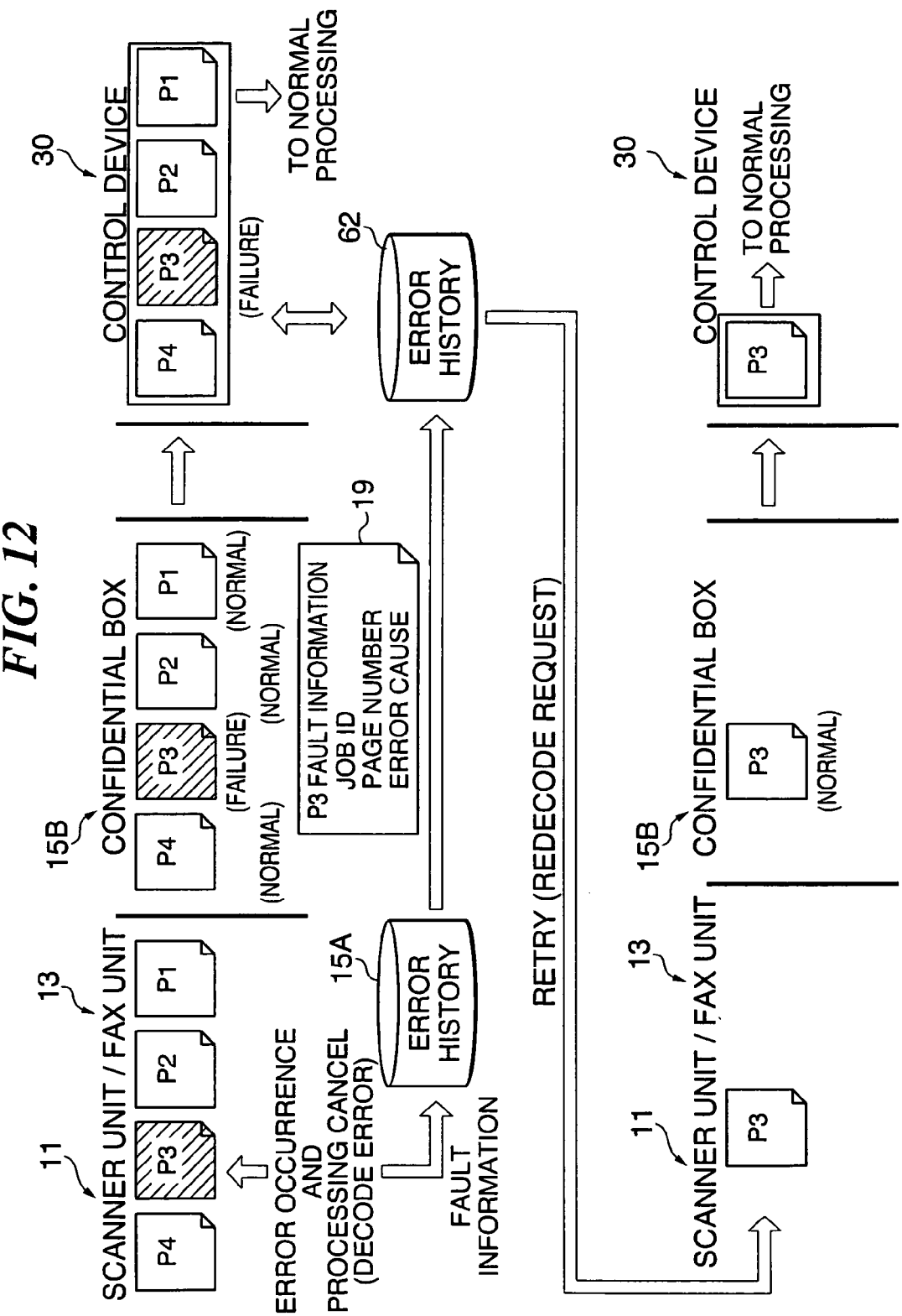

SERVICE PROCESSING SYSTEM, SERVICE PROCESSING METHOD AND SERVICE PROCESSING DEVICE

BACKGROUND OF THE INVENTION

1. Field of the Invention

The present invention relates to a service processing system that provide a service of performing predetermined processes on document data inputted from an input device through cooperation among the processes over a network.

2. Description of Related Art

It is known that there have been network systems that share paper documents and electronic information by connecting the following components over a network: for example, a scanner, facsimile (hereinafter referred to as FAX), copying device, or a multi-function device combining them, a personal computer, and a mail server.

Such network systems capture document files from an input system such as a scanner and a paper-less FAX for reading originals, perform image processing, character recognition, and other processes of a processing system, and distribute the document files to the outside through an output system such as a printer, a mail server, and the like.

Document file capturing, processing, and distribution are performed independently of each other. Therefore, if the operator wants to continuously perform document file capturing, processing, and distribution, predetermined settings must be performed for each of the capturing, processing, and distribution. In other words, the operator must open the respective windows on the capturing, processing, and distribution to perform predetermined input operations.

A work flow system has been known which performs a series of processes from input to output in a sequence defined in advance through cooperation among them over a network. With work flows commonly used in offices such as approval and circulation in mind, many work flow systems are developed as unmodified electronic versions of existing paper-based application systems (See, for example, JP-A-2002-99686, JP-A-2001-325389 and JP-A-2001-195295).

However, the work systems have provided specific services and have been unable to address irregular processes. If an error such as a receive error during FAX receive occurs in the middle of processing, the processing is discontinued, and only processing results before the occurrence of the error have been obtained.

SUMMARY OF THE INVENTION

The present invention has been made to address the above problems and provides a service processing device that provide increased processing reliability for the service of performing predetermined processes on document data through cooperation among the processes over a network.

To address the above problems, according to an aspect of the present invention, a service processing system provides a service of performing predetermined processes on document data through cooperation among the processes over a network. The service processing system includes a service processing device that comprises a controller that controls reexecution of a process in which an error occurs, if the error occurs on the document data in the course of the processes.

According to another aspect of the present invention, a service processing method of providing a service of performing predetermined processes on document data through cooperation among the processes over a network, comprising the step of: controlling reexecution of a process in which an error occurs, if the error occurs on the document data in the course of the processes.

BRIEF DESCRIPTION OF THE DRAWINGS

Preferred exemplary embodiment of the present invention will be described in detail based on the followings, wherein:

FIG. 11 is a conceptual diagram for explaining processing in a case where documents are scanned or subjected to FAX receive, and an input error occurs in the middle of storing the documents in a confidential box as an input plug-in element; and FIG. 12 is a conceptual diagram for explaining processing in a case where documents are scanned or subjected to FAX receive, and a decode error occurs in the middle of storing the documents in a confidential box as an input plug-in element.

DESCRIPTION OF THE PREFERRED EMBODIMENTS

An embodiment of the present invention will be described with reference to the drawings.

Figure 1:
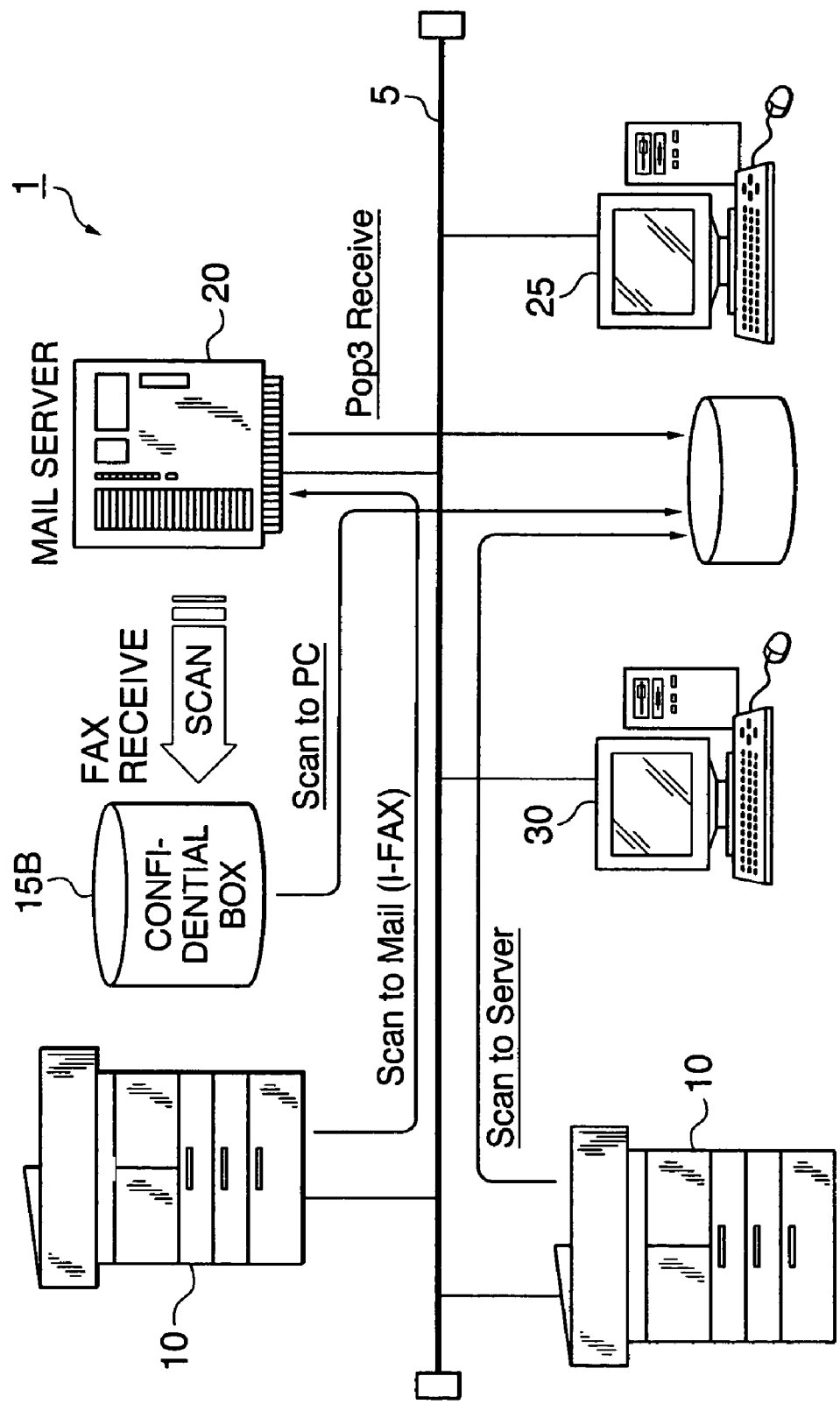
FIG. 1 is a diagram showing a rough configuration of a document shared network system according to an embodiment of the present invention.

FIG. 1 is a diagram showing a rough configuration of a document shared network system 1 according to an embodiment of the present invention.

The document shared network system 1 includes: plural multi-function devices 10 having print functions, scanner functions, and facsimile functions; a mail server 20 sending and receiving electronic mail; plural terminals 25; and a control device 30 that captures documents from predetermined capture destinations and performs predetermined processing for them, then distributes them to predetermined distribution destinations. Although the documents here refer to document data of the present invention, primarily image data on documents, the documents may contain text data depending on states of processing; there are no special limitations on the documents.

The multi-function devices 10, the mail server 20, the terminals 25, and the control device 30 are connected to each other through a network 5. To the network 5, a printer, scanner, and facsimile, though not shown, may be connected.

Figure 2:
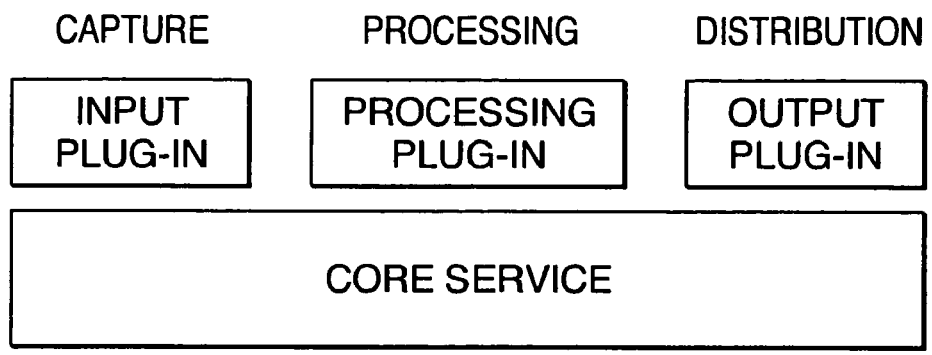
FIG. 2 is a diagram explaining an outline of processing of the document shared network system.

FIG. 2 is a diagram explaining an outline of processing of the document shared network system 1. Although the multi-function devices 10, the mail server 20, the terminals 25, and the control device 30 are connected to each other through the network 5, they usually operate independently of each other. The control device 30 provides core services by setting a capture destination, processing method, and distribution destination in the document shared network system 1, and automatizing and routinizing a series of processes such as document capture, processing, and distribution.

A definition of automatizing and routinizing a series of processes is referred to as a rule. Setting of rules will be described later. Application programs providing the respective specific functions of capture, processing method, and distribution are referred to as input plug-in, processing plug-in, and output plug-in, respectively.

Figure 3:
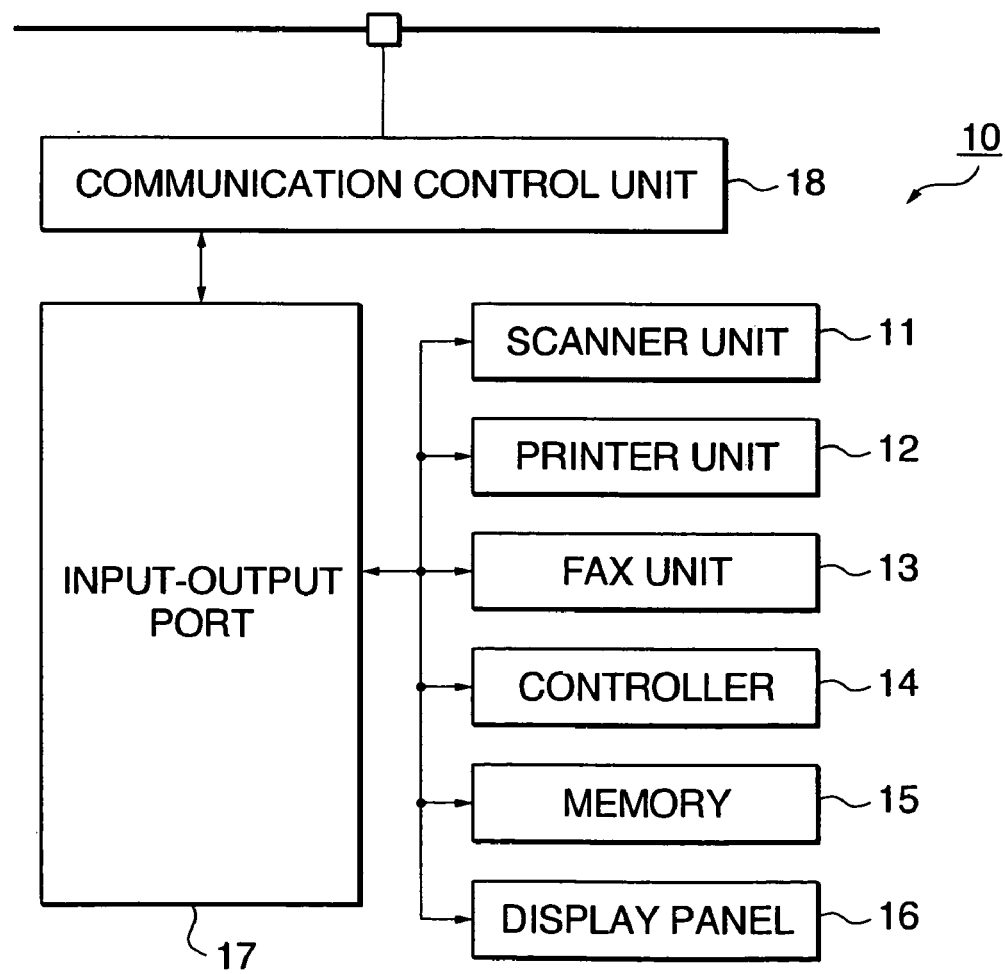
FIG. 3 is a block diagram showing a configuration of a multi-function device.

FIG. 3 is a block diagram showing a configuration of the multi-function device 10.

The multi-function device 10, which provides input plug-in and output plug-in functions, includes: a scanner unit 11 that reads images recorded in documents; a printer unit 12 that records electrostatic latent images in photoconductive materials, develops the electrostatic latent images using a monochrome toner or color toner, and transfers the developed images to recording paper for output; and a FAX unit 13 that sends and receives facsimile telegrams.

The multi-function device 10 further includes: a controller 14 that controls the whole of the system; a memory 15 that stores image data read by the scanner unit, image data received through the network, and data of telegrams received by FAX; a display panel 16 that displays operation screens having icons and inputs operation information in response to a touch on the icons; an input-output port 17 for inputting and outputting data; and a communication control unit 18 performing communications with devices connected to the network.

The scanner unit 11, the printer unit 12, the FAX unit 13, the controller 14, the memory 15, the display panel 16, and the input-output port 17 are connected to each other through a bus. The input-output port 17 is connected to the network 5 through the communication control unit 18. The scanner unit 11 may be incorporated as part of the FAX unit 13.

Figure 8:
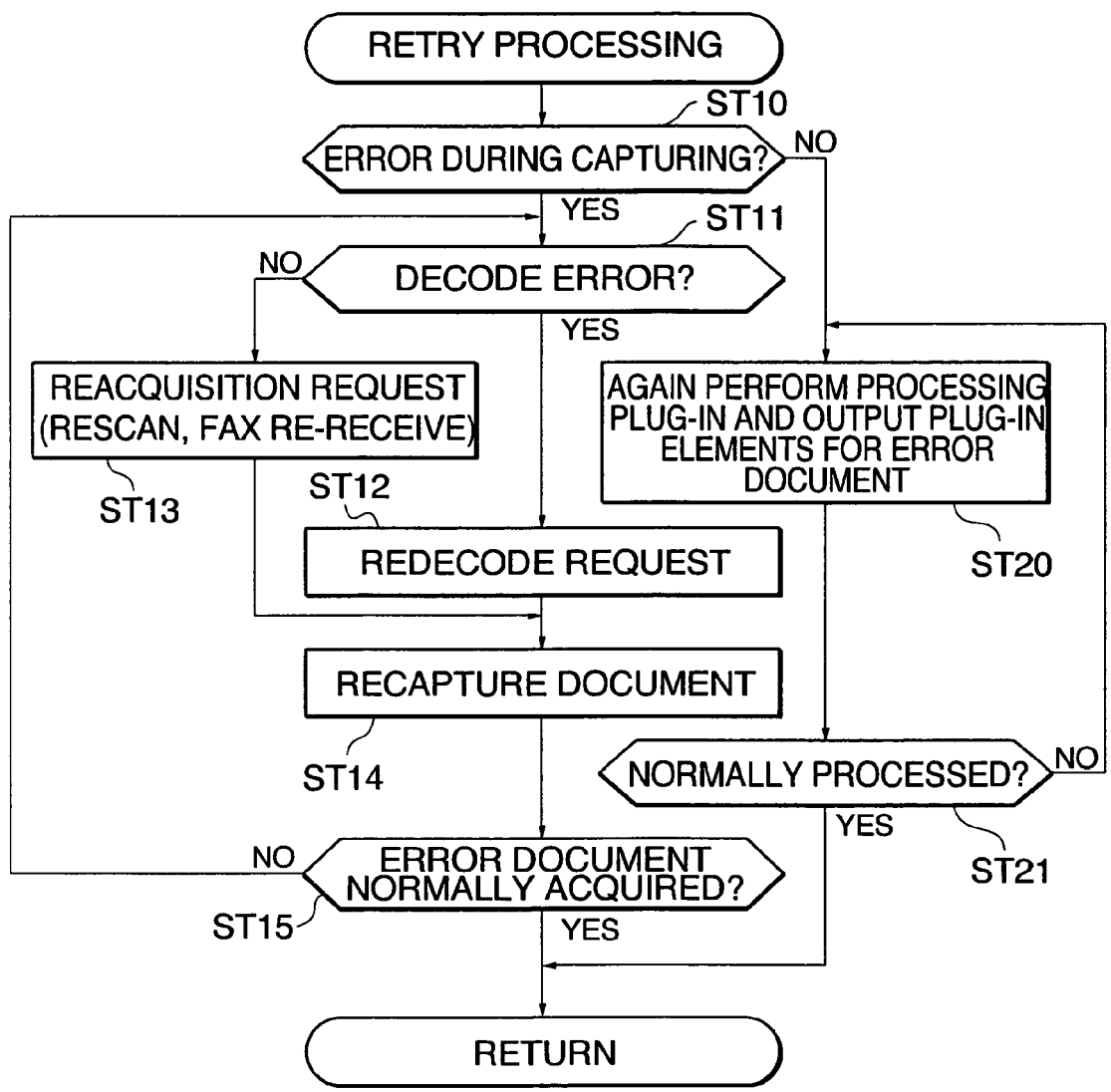
FIG. 8 is retry processing (subroutine) performed in processing of FIG. 7.

When an error occurs during processing, the multi-function device 10 creates fault information 19 identifying the error and stores the created fault information 19 in an error history memory 15A allocated in a predetermined storage area of the memory 15 (see FIG. 8). The fault information includes a job ID for identifying a job, a page number in which the error occurs, the cause of the error, and the like. The causes of errors include communication errors during FAX receive, decode errors indicating failure in decoding receive data and scanning data, and hardware errors such as a paper jam of an original to be read during scanning by use of an automatic original feeding function.

In the multi-function device 10 of the present invention, the predetermined storage area of the memory 15 is partitioned into plural confidential boxes 15B, which are managed by box numbers (e.g., 1 to 300). The multi-function device 10 assigns file names to documents scanned in the scanner unit 11 and documents received in the FAX unit 13, stores the documents in the confidential boxes 15B, and sends the documents to sending destinations set in advance for the confidential boxes 15B.

The mail server 20 provides input plug-in and output plug-in functions and sends and receives electronic mail of the terminals 25 connected to the network 5.

The terminals 25, exemplary personal computers, provides input plug-in, processing plug-in, and output plug-in functions. The terminals 25 sends and receives electronic mail to and from the outside through the mail server 20, stores documents in a file folder, and performs predetermined image processing for documents.

The control device 30 sets a rule as a work flow and performs a series of processes such as document capturing, processing, and distribution on the basis of the rule. The control device 30 may also serve as processing plug-in.

Figure 4:
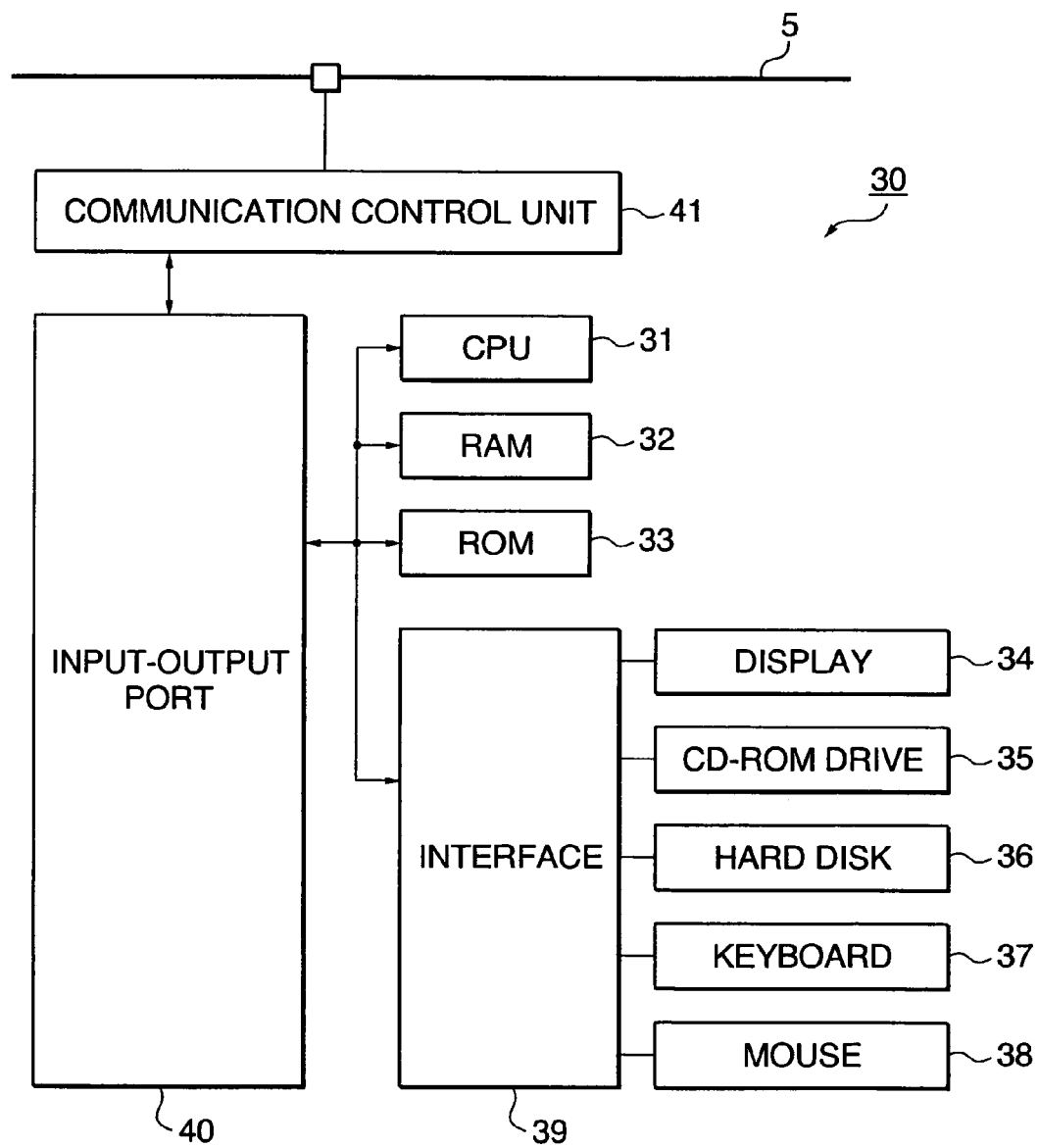
FIG. 4 is a block diagram showing a configuration of a control device.

FIG. 4 is a block diagram showing a configuration of the control device 30.

The control device 30 includes: a CPU (Central Processing Unit) 31 that controls the whole of the system; a RAM (Random Access Memory) 32 as a work area that temporarily stores data; a ROM (Read Only Memory) 33 that stores the control programs of the CPU 31 and the like; a display 34 that displays a rule setting screen for setting rules, and the like; and a CD-ROM drive 35.

The control device 30 includes: a hard disk drive 36 that stores and reads a program for automatizing and routinizing a series of processes such as document capturing, processing, and distribution, application programs for functioning as processing plug-in, and predetermined data and the like; a keyboard 37 that inputs text, symbols, and the like; a mouse 38 as a pointing device; an interface 39 to which these components are connected; an input-output port 40; and a communication control unit 41.

The CPU 31, RAM 32, ROM 33, interface 39, and input-output port 40 are connected to the communication control unit 41 that performs communication with other devices connected to the network 5 such as the multi-function device 10.

The keyboard 37 is used to input command information directly by an operator when various setting screens are displayed in the display 34. The mouse 38, when various setting screens are displayed in the display 34, is used to select displayed items or input the contents of setting commands.

Figure 5:
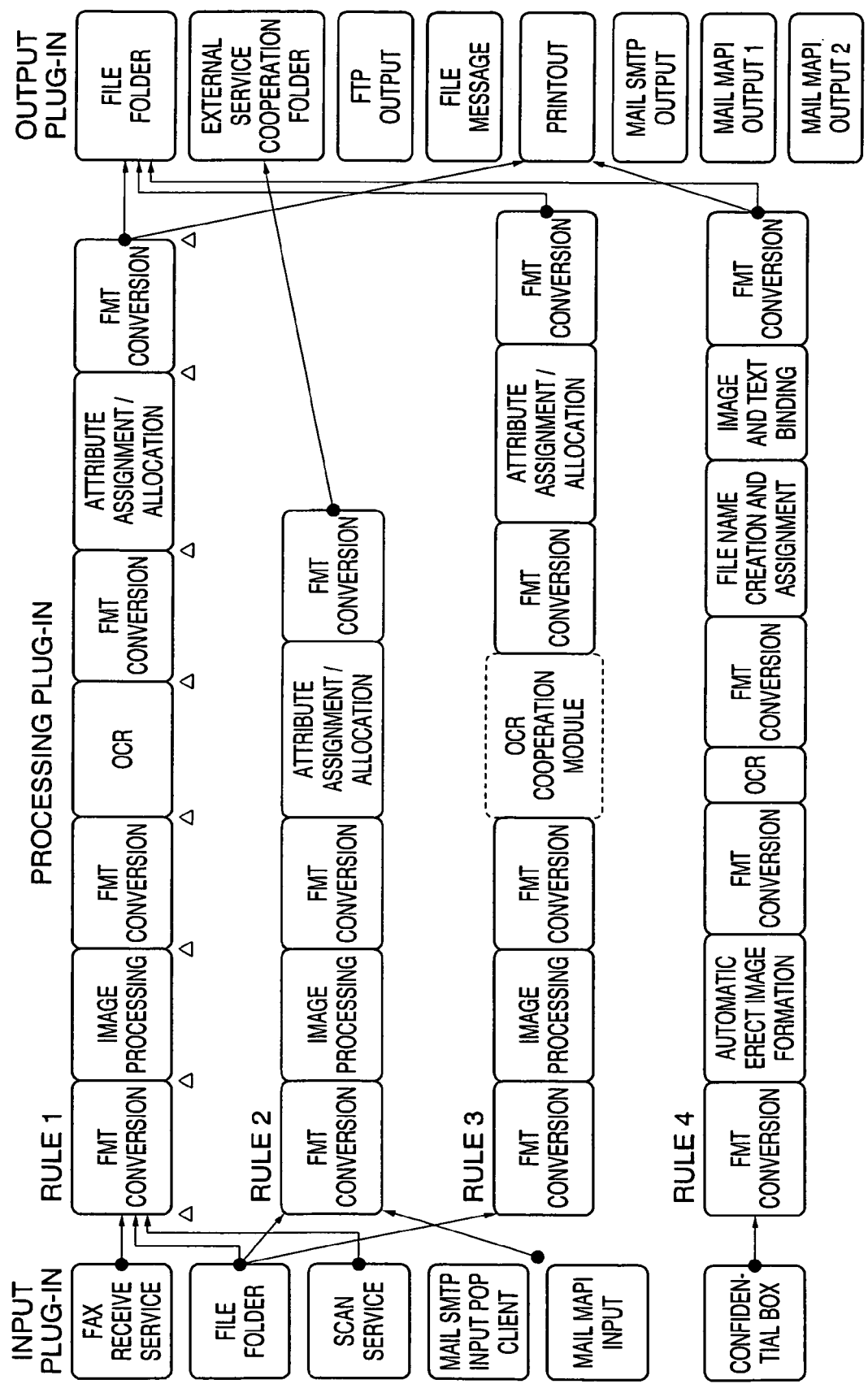
FIG. 5 is a diagram explaining an example of rules that can be created by arbitrarily combining input plug-in, processing plug-in, and output plug-in elements.

FIG. 5 is a diagram explaining an example of rules that can be created by arbitrarily combining input plug-in, processing plug-in, and output plug-in elements by the control device 30.

For example, rule 1 defines capturing documents from plural input plug-in elements (FAX receive service, file folder, scan service), performing plural processing plug-in elements (image processing, optical character recognition (OCR), and attribute assignment/allocation), and distributing the documents subjected to these processes to plural output plug-in elements (file folder and print output).

Rule 2 defines capturing documents from a file folder and Mail_MAPI input, performing image processing and attribute assignment/allocation, and distributing the processed documents to an external service cooperation folder.

Rule 3 defines capturing documents from a file folder, performing image processing, OCR cooperation module, and attribute assignment/allocation, and distributing the processed documents to a file folder.

Rule 4 defines capturing documents from a confidential box 15B of a given box number, performing automatic erect image formation, OCR, file name creation and assignment, image and text binding, and distributing the document subjected to these processes to plural output plug-in elements (file folder and print output).

The rules 1 to 4 perform format (FMT) conversion necessary for a following process before and after each processing plug-in element.

Input plug-in elements include, as shown in FIG. 5, FAX receive service, file folder, scan service, Mail_SMTP input, POP client, Mail_MAPI input, and the like. The confidential box shown in FIG. 1 is also included in input plug-in elements.

Processing plug-in elements include image processing, OCR, attribute assignment/allocation, OCR cooperation module, and the like.

Output plug-in elements include file folder, external service cooperation folder, ftp output, file message, Mail_SMTP output, and Mail_MAPI output. However, input, processing, and output plug-in elements are not limited to the above-described ones.

Figure 6:
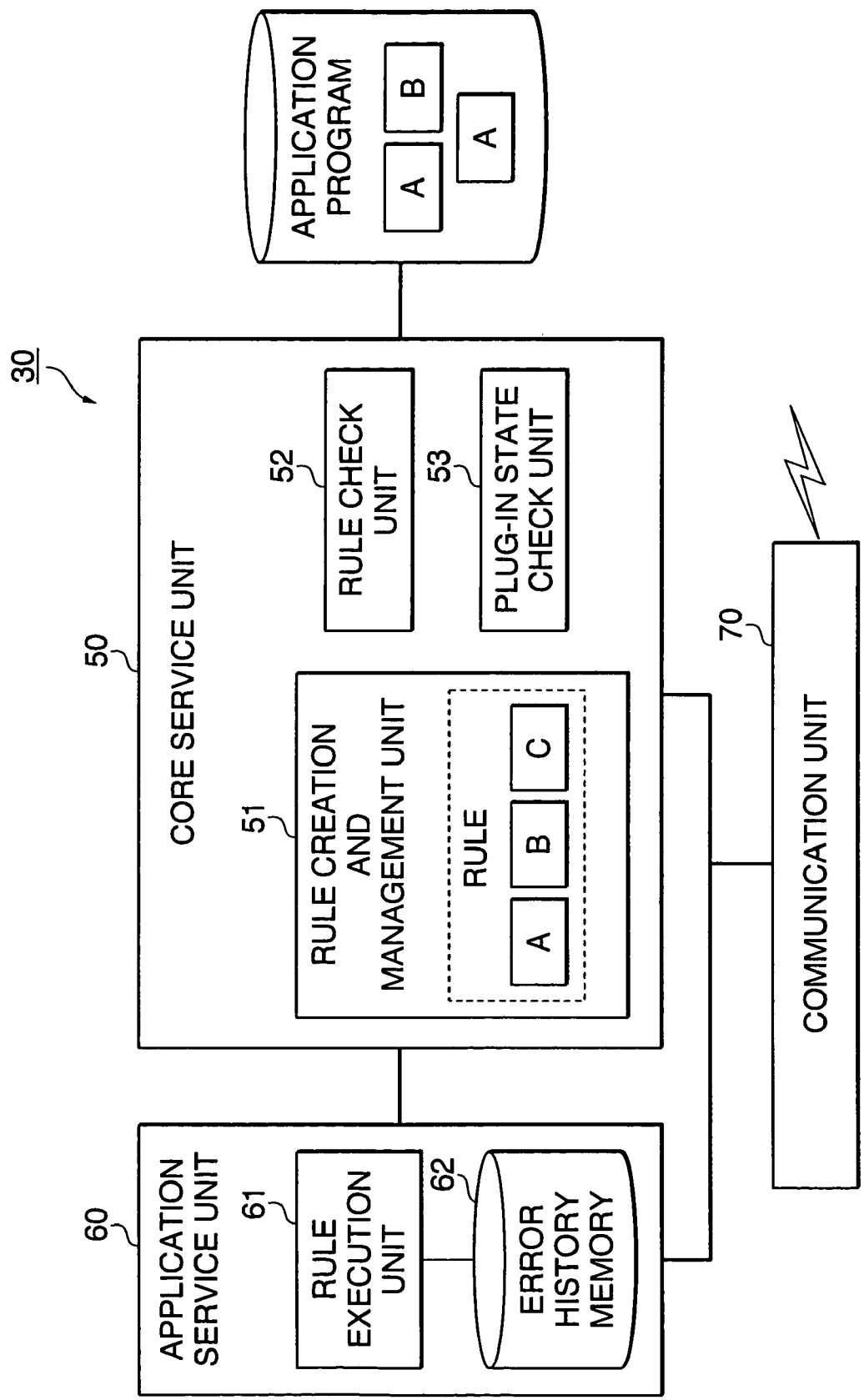
FIG. 6 is a block diagram showing a functional configuration of the control device.

Referring to FIG. 6, a description is made of a function for automatizing and routinizing a series of processes including creation of the above-described rules, document capturing, and processing and distribution in the control device 30 of this embodiment. FIG. 6 is a diagram showing a functional configuration formed in the control device 30, using hardware resources shown in FIG. 4 by program execution in the CPU 31.

As shown in FIG. 6, the control device 30 has functions of a core service unit 50, an application service unit 60, and a communication unit 70.

The core service unit 50 is brought into operation by executing control programs resident in the memory in the CPU 31 when the control device 30 is activated. The core service unit 50 includes: a rule creation and management unit 51; a rule check unit 52; and a plug-in state check unit 53.

The rule creation and management unit 51 creates rules and manages the created rules. Specifically, a rule setting screen (not shown) is displayed on the display 34, capturing destinations, processing methods, and distribution destinations are set based on information inputted by a user through the rule setting screen, and rules defining a series of processes including document capturing, processing, and distribution are created. The created rules are stored in the hard disk drive 36 through the RAM 32 or external storage media not shown.

The rule creation and management unit 51 accepts a recovery mode from the user and sets the recovery mode for a specified rule on the basis of the selection result. In the recovery mode, when an error occurs in the course of a process based on a rule set through the rule setting screen, for a page concerned in the error, the process in which the error occurs, that is, the process not normally performed due to the error is reexecuted.

In this embodiment, one of two types of recovery modes can be selected. In a first recovery mode, when an error occurs, a series of processes based on a rule are temporarily halted and a process in which the error occurs is reexecuted, and after the reexecution, the series of processes are released from the halt. In a second recovery mode, only processing in a location concerned in an error is discontinued, and processing is continued, except in the location concerned in the error.

The rule creation and management unit 51 accepts corrections of stored rules from the rule setting screen (not shown) and can update the stored rules on the basis of correction results. Furthermore, the rule creation and management unit 51 manages only currently executable rules of created rules.

The rule check unit 52 checks a created rule for validity. On the basis of a valid input-output data format of a particular plug-in element, the rule check unit 52 determines whether format mismatch exists between the plug-in element and ones preceding and following it, thereby determining whether the rule is valid. On the basis of the checking result, the rule creation and management unit 51 reports an error to the user to prompt him or her to correct the rule, and accepts rule corrections.

The plug-in state check unit 53 checks a state (ready for operation or not) of each plug-in elements. On the basis of the checking result of the plug-in state check unit 53, the rule creation and management unit 51 determines currently executable rules, and reports an error if an inexecutable rule is specified to be activated.

The application service unit 60 operates when a predetermined rule execution timing is reached; that is, it is formed when the CPU 31 performs processing according to the rule. It includes a rule execution part 61 and an error history memory 62.

The rule execution part 61 performs control processing so that a series of processes are performed according to rules. For rules for which a recovery mode is set, the rule execution part 61, when an error occurs, eliminates the error according to a recovery mode set for the rules. Rules executed in the rule execution part 61 are controlled by the rule creation and management unit 51.

The rule execution part 61, when an error occurs during rule execution, stores error information such as the cause of the error, a job number, and a page number in the error history memory 62 as an error history. As the error history memory 62, for example, a predetermined storage area of the hard disk drive 36 may be used.

The error history stored in the error history memory 62 is used to determine whether an error occurs during rule execution, reexecute a process in which an error occurs, and report an error if the error is not eliminated by the reexecution.

The communication unit 70 performs communications with other devices through the network 5 to send and receive data to and from other devices by the core service unit 50 and the application service unit 60, check states of plug-in elements realized in the other devices, and report errors to the other devices.

The control device 30, when a predetermined rule execution timing is reached, on the basis of rules stored in the hard disk drive 36 and external storage media, performs a series of processes, including capturing of documents from the document shared network system 1, processing of the documents, and distributing them to predetermined distribution destinations.

As described above, if an error occurs in the middle of a series of processes according to a rule, the control device, if no recovery mode is set for the rule, discontinues the series of processes based on the rule at the time of the occurrence of the error; if a recovery mode is set, the control device retries the process in which the error occurs.

Hereinafter, a description is made of processing of the control device 30 during execution of a rule in which a recovery mode is set.

The rule 4 shown in FIG. 5 is used as an example for the description. The rule 4 is executed when documents obtained by subjecting an original to scanning or FAX receive by the scanner unit 11 or FAX unit 13 are stored in a confidential box 15B of a specified box number. In other words, the scanner unit 11 or FAX unit 13 is used as an input part of the present invention, and the multi-function device 10 is a device on the network that inputs document data subject to predetermined processing of the present invention.

In the multi-function device 10, if an error occurs when documents are stored in the confidential box 15B, that is, during scanning or FAX receive, generally, as shown in FIG. 8, fault information 19 indicating the contents (job ID, page number, cause of error) of the error is stored in the error history memory 15A.

Figure 7:
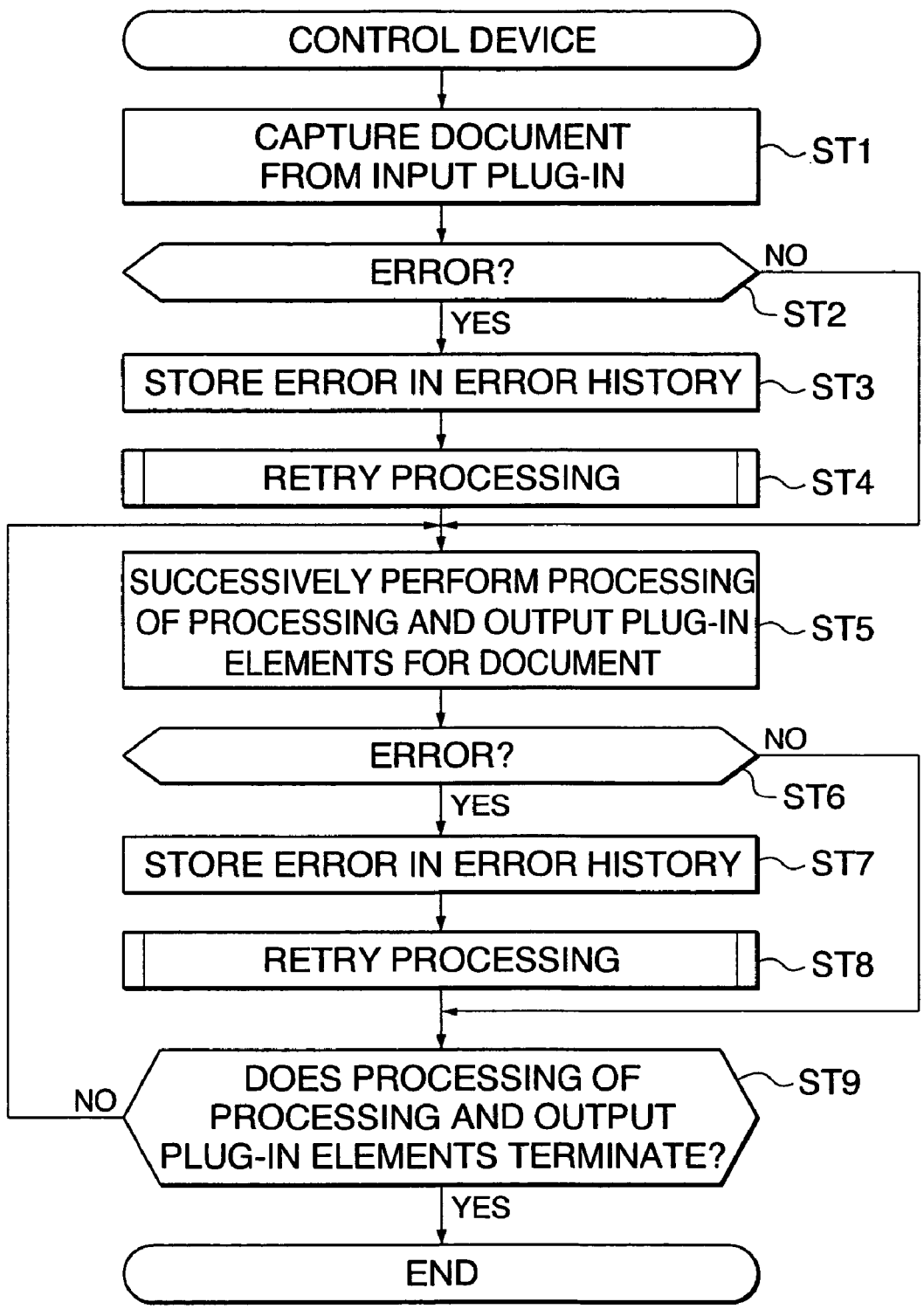
FIG. 7 is a flowchart showing a procedure when a CPU of the control device performs processing according to a rule for which a first recover mode is set.

FIG. 7 is a flowchart showing a procedure when the CPU 31 of the control device 30 performs processing according to a rule for which the first recovery mode is set.

When the CPU 31 of the control device 30 performs processing according to a rule for which the first recovery mode is set, as shown in FIG. 7, at step ST1, documents related to a job are successively captured on a page basis from an input plug-in element (confidential box 15B) specified as a capturing destination of the rule. If documents of all pages have been normally captured, it is determined that no error exists, and from the next step ST2, the control device proceeds to step ST5.

On the other hand, if there is at least one document page that has not been normally captured, it is determined that an error exists, the control device proceeds from step ST2 to step ST3, where the contents of the error are stored in the error history memory 62, then proceeds to step ST4.

Whether an error exists or not can be determined in such a way that the control device 30 refers to the error history memory 15A of the multi-function device 10 to check whether fault information 19 of the corresponding job ID exists. If an error exists, the control device 30 reads the corresponding fault information 19 from the error history memory 15A and stores it in the error history memory 62.

Alternatively, whether an error exists may be determined by reading the fault information 19 newly registered in the error history memory 15A from the multi-function device 10 and sending it to the control device 30. Alternatively, whether an error exists may be determined by determining whether pages of the captured documents are normal.

At step ST4, retry processing shown in FIG. 8 is performed. Since the retry processing is started due to the error during document capturing from the input plug-in element, the control device proceeds from step ST10 of FIG. 8 to step ST11, where it is determined whether the error is a decode error or acquisition error on the document on the basis of the fault information 19 stored in the error history memory 62. If the error is a decode error, the control device proceeds from step ST11 to ST12, where a request is made to redecode an erroneous document.

In the case of rule 4, documents scanned in the scanner unit 11 and documents received in the FAX unit 13 are assigned file names and stored in the confidential boxes 15B as files of predetermined file formats; failure of conversion of the scanned document and received document into the predetermined file formats results in a decode error.

The control device 30 may request the multi-function devices 10 to redecode the data obtained by scanning by the scanner unit 11 or FAX receive in the FAX unit 13.

The multi-function devices 10 store scanned data and data obtained by FAX receive in a buffer area of the memory and, unless immediate deletion of processed data is specified by the user, holds the data until a predetermined timing such as power off, memory full, and input of a forced deletion command from the user is reached. Therefore, the data can be redecoded. Conversely, when the user selects the recovery mode through the rule setting screen (not shown), if the multi-function devices 10 are set to the immediate deletion mode, the user may be prompted to clear the mode.

For decode errors, since a document of a page unsuccessfully converted into the predetermined file format, though unable to perfectly reproduce the original, is stored in the confidential boxes 15B, redecoding may be performed using the document within the confidential boxes 15B.

Since decoding is performed by software, recoding can be performed in devices other than the multi-function devices 10. For example, a program for performing decoding may be installed in the control device 30 so that redecoding is performed in the control device 30.

Decode errors also occur, for example, when data of fixed sizes and variable sizes mix in scanned documents. Also, for example, for Internet FAX services, as documents, different color profile data for different pages and data different in file format such as TIFF files and PDL files may be received. Decode errors occur also when such data in which documents of different formats are bound is received.

On the other hand, if the error is not a decode error but an acquisition error, the control device proceeds from step ST11 to step ST13, where a request to reacquire the document is made.

In the case of the rule 4, a paper jam during scanning in the scanner unit 11 and communication errors during FAX receive in the FAX unit 13 are counted as input errors.

The control device 30 may request document reacquisition by requesting the multi-function devices 10 to reexecute scanning in the scanner unit 11 or to make a request to the FAX unit 13 for FAX re-receive to make a request to a communication party (FAX sending source) for FAX resend.

As methods of requesting FAX resend, in cases where FAX re-receive is requested, if the FAX unit 13 is in connection with a communication party, a request may be made to the communication party for FAX resend as to a document of a page unsuccessfully acquired, for the duration of the connection. If communication with the communication party is disabled, the FAX unit 13 may be requested to restore connection with the communication party by means of its FAX number to make a request to the communication party for FAX resend, or send FAX to make a request to the user of the communication party for resend. If FAX is resent by operations by the user of the communication party, what job is concerned in the resend may be determined from a FAX number of the communication party.

In this way, after redecoding is requested at step ST12 or reacquisition is requested at step ST13, the control device proceeds to step ST14, where the document is recaptured. In the case of the rule 4, the document to be captured is a document stored in the confidential boxes 15B after being redecoded in the multi-function devices 10 upon receipt of a redecoding request, or a document stored in the confidential boxes 15B after being rescanned or received again by FAX in the multi-function devices 10 upon receipt of a reacquisition request.

Thereafter, until a document (error document) of a page not normally captured at step ST1 described previously is normally captured at step ST14, the same processing is repeated with wraparound from the step ST15 to the step ST11. After the error document has been normally captured, positive determination is made in the next step ST11 and the control device returns to FIG. 7.

The control device 30, by the retry processing in FIG. 8, when errors occur during document capturing from the input plug-in element, eliminates the errors by prompting redecoding or re-receiving to recapture the redecoded or re-received document. The control device returns to processing of FIG. 7 after the error document has been normally captured and the errors have been eliminated, that is, in a state in which documents of all pages have been normally captured.

If the error document cannot be normally captured regardless of the repeat over a predetermined number of times, an error indicating recovery failure is reported to the user and the rule-based processing is discontinued.

Returning to FIG. 7, the control device proceeds to step ST5, where the control device 30 performs processing of processing plug-in elements set as a processing method of the rule for a page of the captured document, and distributes the document according to distribution conditions to output plug-in elements (e.g., file folder) set as distribution destinations.

In the case of the rule 4, at step ST4, format conversion is performed as required, automatic formation of erect image is made by rotating the document (image) so that the document is erected, optical character recognition (OCR) is performed, a file name is created using part of recognized characters and appended to text having been subjected to OCR processing, the image of the document is bound, and it is stored in a file folder and printed out.

Format conversion may be automatically performed based on the set processing plug-in elements or performed by manual setting by an operator.

Processing of the processing plug-in elements and distribution to the output plug-in elements are repeatedly executed with wraparound to step ST5 from step ST9 through the next step ST6 until they terminate for all pages of the captured documents. However, if an error occurs midway because of, e.g., failure in format conversion, the control device proceeds from step ST5 to step ST7.

At step ST7, fault information indicating the contents of the error is recorded in the error history memory 62, and then retry processing as shown in FIG. 8 is performed at step ST8. Since the retry processing is started due to an error during processing in the processing plug-in elements or storage to the output plug-in elements, the control device proceeds from the ST10 to step ST20 in FIG. 8, where processing of the processing plug-in elements for pages of document (error document) in which the error occurs, and storage of the pages to the output plug-in elements are reexecuted. The processing of the processing plug-in elements for the error document may be reexecuted not from the start thereof but from processing following processing in error; only storage may be reexecuted.

Until the processing of the processing plug-in elements for the error document and storage to the output plug-in elements are normally performed, the control device returns from the step ST21 to the step ST20. If the processing has been successfully performed, positive determination is made at step ST21 and the control device returns to FIG. 7.

The control device 30, by the retry processing in FIG. 7, eliminates the errors by reexecuting processing of the processing plug-in elements for the error document and storage to the output plug-in elements. If the processing and storage have been normally performed and errors have been eliminated, the control device 30 returns to processing of FIG. 7.

If the processing of the processing plug-in elements and the output plug-in elements for the error document has not bee normally performed regardless of the repeat over a predetermined number of times, an error indicating recovery failure is reported to the user and the rule-based processing is discontinued.

Returning to FIG. 7, the control device proceeds to the step ST9, and if unprocessed pages remain, returns to the step ST5 from the step ST9. Upon termination of the processing of the processing plug-in elements for pages of captured document and storage of the pages to the output plug-in elements, positive determination is made at step ST9 and the processing of FIG. 7 terminates.

Thus, in the first recovery mode, when an error occurs in the course of a series of processes based on a rule, the series of processes based on a rule are temporarily halted at the time when the error occurs. For a page concerned in the error, by reexecuting the processing in which the error occurs, the error is eliminated. If the error has been eliminated, the halt is cleared and the series of processes based on a rule are continued. That is, in the first recovery mode, as soon as an error occurs, processing in which the error occurs is reexecuted (retry processing) to eliminate the error.

Figure 9:
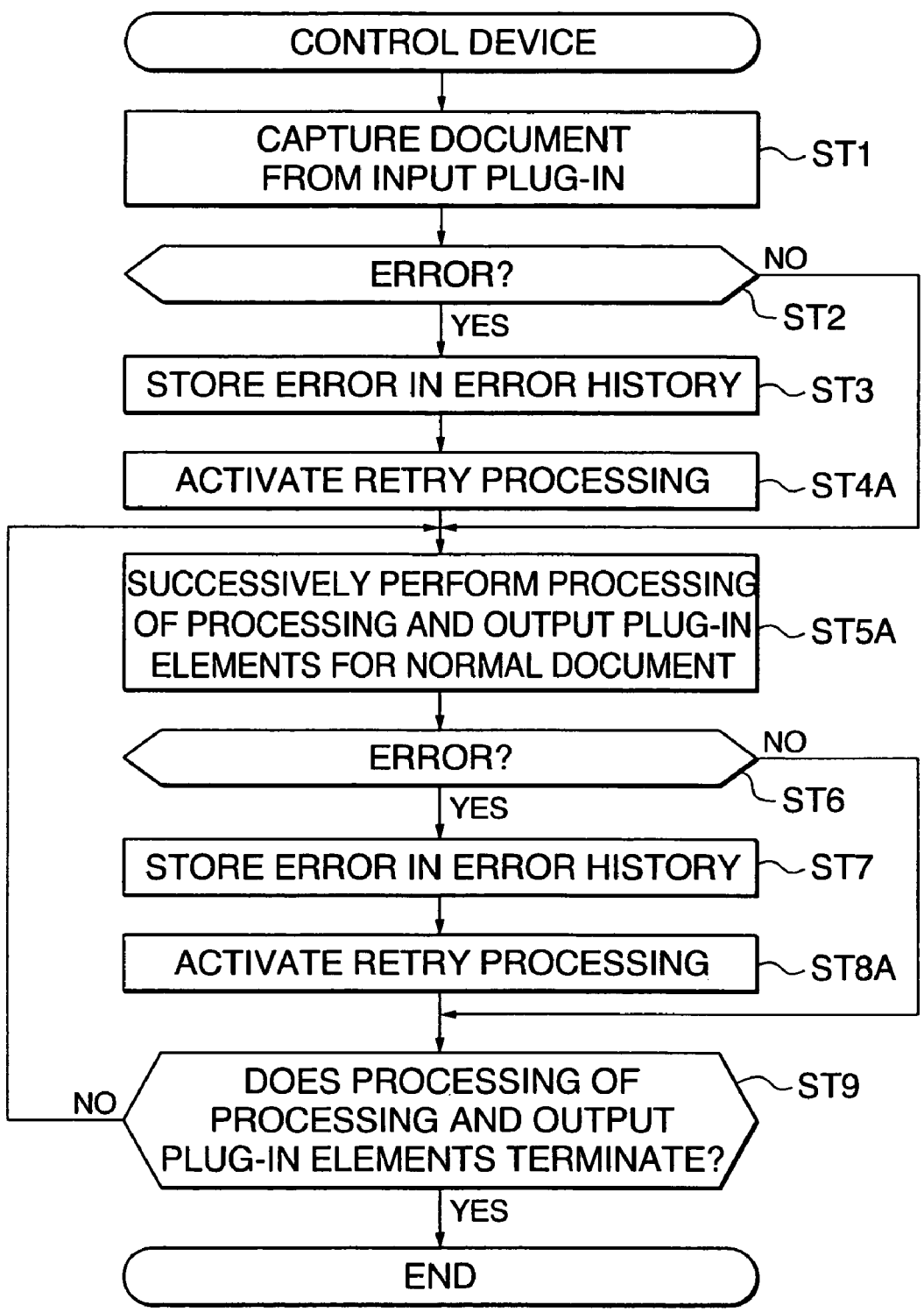
FIG. 9 is a flowchart showing a procedure when a CPU of the control device performs processing according to a rule for which a second recover mode is set.

FIG. 9 is a flowchart showing a procedure when the CPU 31 of the control device 30 performs processing according to a rule for which the first recovery mode is set. The same processes in FIG. 9 as those in FIG. 7 are identified by identical step numbers, and excluded from detailed descriptions here.

When the CPU 31 of the control device 30 performs processing according to a rule for which the second recovery mode is set, as shown in FIG. 9, at step ST1, documents are successively captured on a page basis from an input plug-in element (confidential box 15B). If the documents of all pages have been normally captured, from the next step ST2, the control device proceeds to step ST5A described later. If an error exists, the control device proceeds to step ST3 from step ST2 to store the contents of the error in the error history memory 62, and in the next step ST4A, activates retry processing (described later) shown in FIG. 10 as processing separate from the processing in FIG. 9 before proceeding to step ST5A.

At step ST5A, the control device 30 determines whether the captured documents are normal, on a page basis, and performs processing of processing plug-in elements set as a processing method of the rule only for pages of the normal documents normally captured, and distributes the documents according to distribution conditions to output plug-in elements (e.g., file folder) set as distribution destinations.

Whether the document of the captured pages is normal can be easily determined by referring to the fault information 19 stored in the error history memory 62.

If the documents of all pages have been captured from the input plug-in element, at step ST5A, processing of the processing plug-in elements and storage of the output plug-in elements are performed for all the pages. If errors exist in the captured documents, at step ST5A, the processing of the processing plug-in elements and storage of the output plug-in elements are not performed for pages in error but for only pages normally captured.

Processing of the processing plug-in elements and distribution to the output plug-in elements are repeatedly executed with wraparound to step ST5A from step ST9 through the next step ST6 until they terminate for pages of the normal documents. However, if an error occurs midway because of, e.g., failure in format conversion, processing on the page in which the error occurs is discontinued, and the control device proceeds from step ST6 to step ST7.

At step ST7, the control device 30 records fault information indicating the contents of the error in the error history memory 62, and in the next step ST8A, activates retry processing (described later) shown in FIG. 10 as processing separate from the processing in FIG. 9 before proceeding to step ST5A. If unprocessed pages remain, the control device 30 returns to the step ST5A from the step ST9. Processing on pages in which errors occur may be discontinued at the time when the errors occur, or the pages may be distributed to the output plug-in elements, with the errors left intact.

Upon termination of the processing of the processing plug-in elements for pages of the document normally captured and storage of the pages to the output plug-in elements, positive determination is made at step ST9 and the processing of FIG. 9 terminates.

Figure 10:
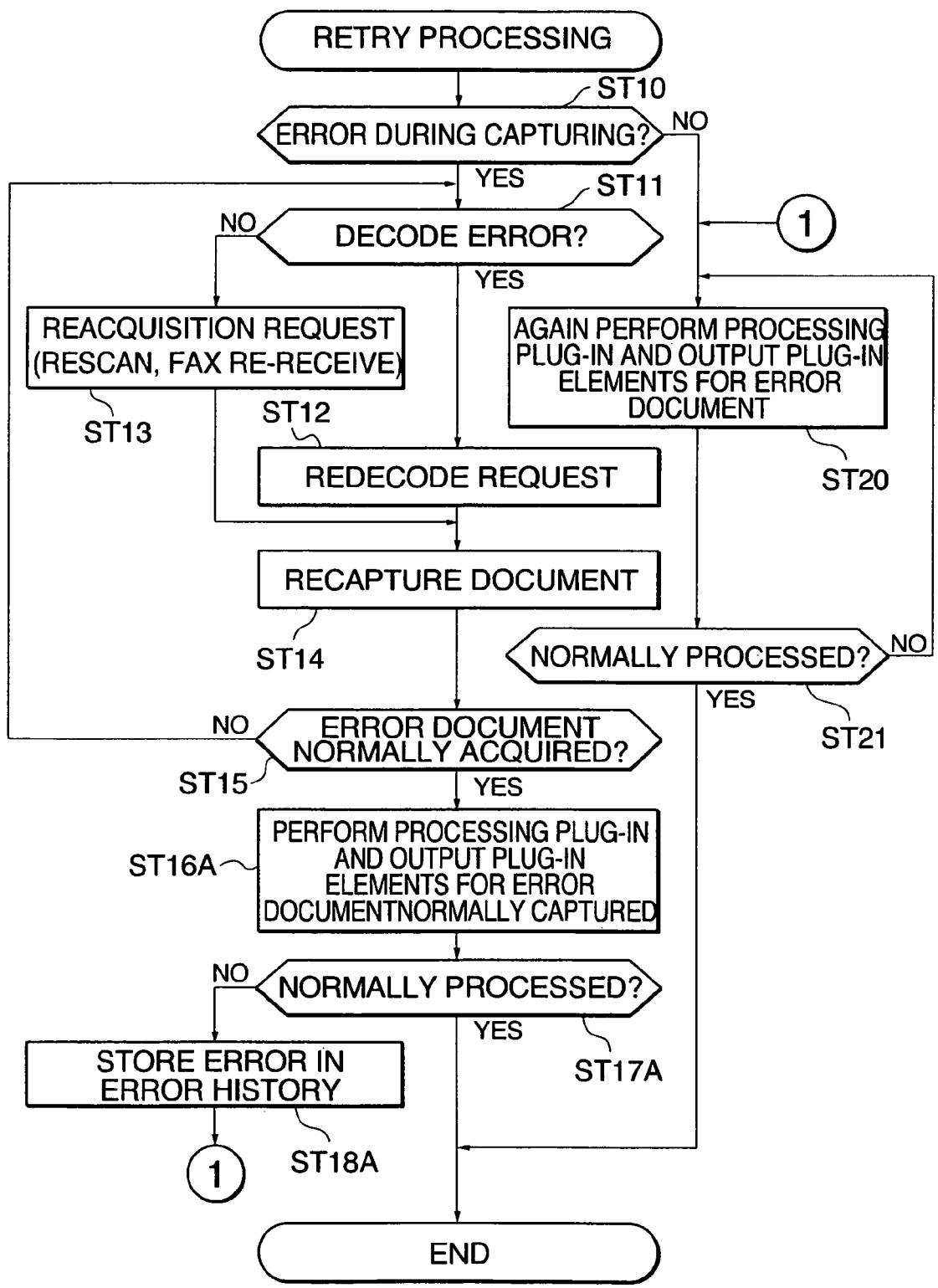
FIG. 10 is retry processing, activated by processing of FIG. 9, that is performed in parallel with FIG. 9.

On the other hand, when retry processing is activated at steps ST4A and ST8A, the control device 30 performs processing shown in FIG. 10 in parallel with the processing in FIG. 9. The same processes in FIG. 9 as those in FIG. 7 are identified by identical step numbers, and excluded from detailed descriptions here.

As shown in FIG. 9, if retry processing is activated because of an error during document capturing from the input plug-in element, the control device 30 proceeds from the step ST10 to step ST11 to determine from the fault information 19 stored in the error history memory 62 whether the error is a document decode error or acquisition error.

If the error is a decode error, the control device 30 proceeds to the step ST12 to request redecoding a document in which the error occurs. If the error is not a decode error but an acquisition error, the control device 30 proceeds to the ST13 to request reacquisition of the document, and then proceeds to the step ST14 to recapture the document.

If the error document cannot be normally acquired by the recapturing, the control device 30 returns to the step ST11 from the next step ST15 to repeat the same processing until the error document is normally acquired. If the error document can be normally acquired, the control device 30 proceeds from the step ST15 to the step ST16A.

If the error document cannot be normally captured regardless of the repeat over a predetermined number of times, an error indicating recovery failure is reported to the user and the rule-based processing is discontinued.

At step 16A, processing of the processing plug-in elements and storage to the output plug-in elements are successively performed for the error document normally captured.

If an error occurs in the course of processing of the processing plug-in elements and storage to the output plug-in elements, the control device proceeds from the next step 17A to step ST18A to store fault information indicating the contents of the error in the error history memory 62, and proceeds to step ST20 described later.

If processing of the processing plug-in elements and storage to the output plug-in elements are normally performed for the error document normally captured, positive determination is made in the next step ST17 and the retry processing of FIG. 10 terminates.

If retry processing is activated because of an error during processing of the processing plug-in elements and storage to the output plug-in elements, the control device proceeds from the step ST10 to step ST20 to reexecute processing of the processing plug-in elements and storage to the output plug-in elements for a document (error document) in which the error occurs. Until the processing of the processing plug-in elements for the error document and storage to the output plug-in elements are normally performed, the control device returns from the step ST21 to the step ST20. If the processing has been successfully performed, positive determination is made at step ST21 and the retry processing of FIG. 10 terminates.

Although not shown in the figure, if processing of the processing plug-in elements and the output plug-in elements cannot be normally performed regardless of the repeat over a predetermined number of times, an error indicating recovery failure is reported to the user and the rule-based processing is discontinued.

By the above-described processing, in the second recovery mode, when an error occurs, only processing of a page in which the error occurs, that is, a location concerned in the error is discontinued, and a series of processes are continued for document data except the page in which the error occurs, that is, the location concerned in the error. In processing separate from the continued processing, processing of the page in which the error occurs, that is, the location concerned in the error is reexecuted to eliminate the error.

In other words, in the second recovery mode, when an error occurs, a series of processes based on a rule are continued if possible, and processing in which the error occurs is reexecuted (retry processing) as separate processing to eliminate the error.

In the second recovery mode, if an error is successfully eliminated, a result of a series of processes based on a rule for documents of all pages that should naturally exist can be obtained. Even if the error were unsuccessfully eliminated, except that a result of the series of processes on a page in which the error occurs could not be obtained, processing results on other pages could be obtained.

In FIG. 9, the retry processing of FIG. 10 is activated at the time when the error occurs, and processing in which an error occurs is reexecuted concurrently with the processing of FIG. 9. However, the timing of activating retry processing is not limited to the embodiment. The timing of activating retry processing may be a predetermined timing other than the time when an error occurs, such as after termination of the processing of FIG. 9. In this case, retry processing for eliminating errors may be activated in the order in which fault information 19 was registered in the error history memory 62.

In this way, in the document shared network system 1 according to this embodiment, when an error occurs during a series of processes based on a rule, processing in which the error occurs is reexecuted under control of the control device 30 to eliminate the error. As a result, higher reliability can be obtained than in conventional systems.

Also for errors during document input in an input plug-in element (confidential box 15B in the case of the rule 4) which triggers rule-based processing, the errors are eliminated by reexecution. As a result, higher processing efficiency can be obtained than with prior arts by which the occurrence of an error during document input has disabled rule-based processing.

With reference to FIGS. 11 and 12, a detailed description will be made of a case where an error occurs during document input in an input plug-in element. The following description assumes that the second recovery mode is set.

FIG. 11 shows a case where an input error occurs, for example, in a third page of four pages in total when an original is being scanned by the scanner unit 11 or subjected to FAX receive by the FAX unit 13 to acquire documents and store them in a confidential box 15B, the scanning or FAX receive is discontinued, and the first page and second page are stored as normal documents in the confidential box 15B.

In this case, the control device 30 continues rule-based normal processing for normal documents of the first page and second page captured from the confidential box 15B, obtains fault information 19 indicating the contents of the error of the third page in which the error occurs, from the error history memory 15A, and stores it in the error history memory 62. The control device 30 makes a request to the scanner unit 11 or FAX unit 13 for rescan or FAX re-receive on the basis of the fault information 19, and if documents are newly stored in the confidential box 15B, captures the documents and performs rule-based normal processing for the documents of the third page and following page having not been processed due to the error, of documents of four pages in total. Thereby, even if input errors occur, the errors could be eliminated.

FIG. 12 shows a case where a decode error occurs, for example, in a third page of four pages in total when an original is being scanned by the scanner unit 11 or subjected to FAX receive by the FAX unit 13 to acquire documents and store them in a confidential box 15B, and a document of a fourth page, which is the last page after the error, is normally acquired.

In this case, the control device 30 continues rule-based normal processing for normal documents of first, second, and fourth pages captured from the confidential box 15B, obtains fault information 19 indicating the error contents of the third page in which the error occurs, from the error history memory 15A, and stores it in the error history memory 62 of the control device 30. The control device 30 requests the scanner unit 11 or FAX unit 13 to redecode a document of the third page on the basis of the fault information 19, and if the redecoded document is newly stored in the confidential box 15B, captures the document and performs rule-based normal processing for the document of the third page having not been processed due to the error. Thereby, even if decode errors occur, the errors could be eliminated.

The above description has been made of an example of application of the present invention to the document shared network system 1 as a service processing system, wherein the document shared network system 1 has the network 5 provided on the network and provides the service of performing a series of processes, including document capturing, processing, and distribution, according to a rule defined in advance as a work flow under control of the control device 30 provided on the network 5 through cooperation among the processes over the network 5. However, the present invention is not limited to the embodiment. The present invention can apply to any service processing system that can continuously perform a series of processes according to a work flow.

As has been described above, the present invention has the excellent effect of providing increased processing reliability for a service processing system that provides the service of performing predetermined processes on document data through cooperation among the processes over a network.

The entire disclosure of Japanese Patent Application No. 2003-058695 filed on Mar. 5, 2003 including specification, claims, drawings and abstract is incorporated herein by reference in its entirety.

What is claimed is:

1. A service processing system providing a service of performing a predetermined series of processes on document data through cooperation among the processes over a network comprising:
    a control device;
    a storage device, provided in a control device, that stores a work flow of the predetermined series of processes;
    an acquisition device that acquires document data on a page basis;
    a decoding device that decodes the acquired document data on a page basis;
    a controller provided in the control device that determines whether an acquisition error indicating failure in acquiring the document data occurs and whether a decode error indicating failure in decoding the acquired document data occurs, and executes a recovery process to eliminate the acquisition error when the acquisition error occurs and the decode error when the decode error occurs;
    a rule management unit that dynamically creates and modifies rules relating to errors occurring in processing tasks for the predetermined series of processes on document data, the rules being dynamically created based upon capturing destinations, processing methods, and distribution destinations for the service processing system; and
    a recovery unit that performs recovery processing on the document data based upon the particular rule managed by the rule management unit,
    wherein, in the recovery process, the controller requests to resend a page of the document data in which the acquisition error occurs and controls reexecution of a decoding process of a page of the document data in which the decode error occurs.

2. The service processing system according to claim 1, wherein the controller temporarily halts the predetermined processes when the acquisition error or the decode error occurs, executes the recovery process, and clears the halt after the execution of the recovery process.

3. The service processing system according to claim 1, wherein the controller continues execution of the predetermined processes on document data except for the process of the page of the document data in which the acquisition error or the decode error occurs, and performs the execution of the recovery process separately from the continued processes of the predetermined processes.

4. The service processing system according to claim 1,
    wherein the predetermined series of processes originate from a plurality of multi-function devices and include at least a document capturing process, a document processing process, and a document distribution process,
    wherein each of the multi-function devices provide at least one of an input plug-in function, a processing plug-in function and an output plug-in function, and
    wherein the control device automates and routinizes the predetermined series of processes.

5. The service processing system according to claim 1, further comprising:
    a rule check unit that checks the dynamically created rules for validity.

6. A service processing device in a service processing system providing a service of performing a predetermined series of processes on document data through cooperation among the processes over a network comprising:
    an acquisition unit that acquires document data on a page basis;
    a decoder that decodes the acquired document data on a page basis;
    a controller that determines whether an acquisition error indicating failure in acquiring the document data occurs and whether a decode error indicating failure in decoding the acquired document data occurs, and executes a recovery process to eliminate the acquisition error when the acquisition error occurs and the decode error when the decode error occurs;
    a rule management unit that dynamically creates and modifies rules relating to errors occurring in processing tasks for the predetermined series of processes on document data, the rules being dynamically created based upon capturing destinations, processing methods, and distribution destinations for the service processing system; and
    a recovery unit that performs recovery processing on the document data based upon the particular rule managed by the rule management unit,
    wherein, in the recovery process, the controller requests to resend a page of the document data in which the acquisition error occurs and controls reexecution of a decoding process of a page of the document data in which the decode error occurs.

7. The service processing device according to claim 6, wherein the controller temporarily halts the predetermined processes when the acquisition error or the decode error occurs, executes the recovery process, and clears the halt after the execution of the recovery process.

8. The service processing device according to claim 6, wherein the controller continues execution of the predetermined processes on document data except for the process of the page of the document data in which the acquisition error or the decode error occurs, and performs the execution of the recovery process separately from the continued processes of the predetermined processes.

9. The service processing device according to claim 6, wherein the acquisition error is a communication error during FAX receive.

10. The service processing device according to claim 6,
    wherein the predetermined series of processes originate from a plurality of multi-function devices and include at least a document capturing process, a document processing process, and a document distribution process, wherein each of the multi-function devices provide at least one of an input plug-in function, a processing plug-in function and an output plug-in function, and wherein the controller automates and routinizes the predetermined series of processes.

11. A service processing method of providing a service of performing a predetermined series of processes on document data through cooperation among the processes over a network, comprising:

acquiring document data on a page basis;

decoding the acquired document data on a page basis;

determining whether an acquisition error indicating failure in acquiring the document data occurs and whether a decode error indicating failure in decoding the acquired document data occurs;

executing a recovery process to eliminate the acquisition error when the acquisition error occurs and the decode error when the decode error occurs;

dynamically creating and modifying rules relating to errors occurring in processing tasks for the predetermined series of processes on document data, the rules being dynamically created based upon capturing destinations, processing methods, and distribution destinations for the service processing method; and performing recovery processing on the document data based upon the rules relating to processing tasks for the predetermined series of processes on document data, wherein, in the recovery process, resending a page of the document data in which the acquisition error occurs is requested and reexecution of a decoding process of a page of the document data in which the decode error occurs is performed, occurs.

12. The service processing method according to claim 11, further comprising:

temporarily halting the predetermined processes when the acquisition error or the decode error occurs;

executing the recovery process; and clearing the halt after the execution of the recovery process.

13. The service processing method according to claim 11, further comprising:

continuing execution of the predetermined processes on document data except for the process of the page of the document data in which the acquisition error or the decode error occurs; and performing the execution of the recovery process separately from the continued processes of the predetermined processes.

14. The service processing method according to claim 11, wherein the acquisition error is a communication error during FAX receive.

15. The service processing method according to claim 11, wherein the predetermined series of processes originate from a plurality of multi-function devices and include at least a document capturing process, a document processing process, and a document distribution process, wherein each of the multi-function devices provide at least one of an input plug-in function, a processing plug-in function and an output plug-in function, and wherein a controller automates and routinizes the predetermined series of processes.

16. A service processing system which processes on a network in association with a service, the service performing a series of a plurality of processes, in a predefined order, with respect to document data, the system comprising:

a control means which performs control such that when there is an error with respect to processing of the document data during execution of the series of the plurality of processes, the control means executes the processes following the process in which there was the error by using a process different from the processes after the process in which there was the error and executes the processes with respect to portions of the document data other than a location in which there was the error, the control means then re-executes the processing of the portion of the document data at the location in which the error occurred.

17. The service processing system as set forth in claim 16, wherein when the control means performs the control so as to cause the re-execution, the control means performs control so as to execute the processes following the process in which there was the error among the series of the plurality of processes, with respect to the portion of the location in which there was the error, by using different processes.

18. A service processing device which processes on a network in association with a service, the service performing a series of a plurality of processes, in a predefined order, with respect to document data, the device comprising:

a control unit which performs control such that when there is an error with respect to processing of the document data during execution of the series of the plurality of processes, the control unit executes the processes following the process in which there was the error by using a process different from the processes after the process in which there was the error and executes the processes with respect to portions of the document data other than a location in which there was the error, the control unit then re-executes the processing of the portion of the document data at the location in which the error occurred.

19. The service processing device as set forth in claim 18, wherein when the control unit performs the control so as to cause the re-execution, the control unit performs control so as to execute the process following the process in which there was the error among the series of the plurality of processes, with respect to the portion of the location in which there was the error, by using different processes.

20. A service processing method which processes on a network in association with a service, the service performing a series of a plurality of processes, in a predefined order, with respect to document data, the method comprising:

performing control such that when there is an error with respect to processing of the document data during execution of the series of the plurality of processes, the processes following the process in which there was the error are executed by using a process different from the processes after the process in which there was the error and executed with respect to portions of the document data other than a location in which there was the error; and re-executing the processing of the portion of the document data at the location in which the error occurred.

21. The service processing method as set forth in claim 20, wherein when performing control so as to cause the re-execution, the performing control executes the processes following the process in which there was the error among the series of the plurality of processes, with respect to the portion of the location in which there was the error, by using different processes.

* * * * *